US011268463B2

(12) United States Patent
Stroh et al.

(10) Patent No.: US 11,268,463 B2
(45) Date of Patent: Mar. 8, 2022

(54) TECHNIQUES FOR IMPROVING FUEL ECONOMY IN DEDICATED EGR ENGINES

(71) Applicant: Cummins Inc., Columbus, IN (US)

(72) Inventors: David J. Stroh, Columbus, IN (US); Kartavya Neema, Columbus, IN (US); Anthony Kyle Perfetto, Columbus, IN (US); Shashank Tamaskar, West Lafayette, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/906,377

(22) Filed: Jun. 19, 2020

(65) Prior Publication Data

US 2020/0318564 A1 Oct. 8, 2020

Related U.S. Application Data

(63) Continuation of application No. PCT/US2017/067675, filed on Dec. 20, 2017.

(51) Int. Cl.
*F02D 41/00* (2006.01)
*F02M 26/01* (2016.01)
*F02M 26/04* (2016.01)
*F02D 41/14* (2006.01)
(Continued)

(52) U.S. Cl.
CPC ....... *F02D 41/0052* (2013.01); *F02D 41/006* (2013.01); *F02D 41/008* (2013.01); *F02D 41/1475* (2013.01); *F02M 26/01* (2016.02); *F02M 26/04* (2016.02); *F02P 5/145* (2013.01);
(Continued)

(58) Field of Classification Search
CPC .. F02D 41/0052; F02D 41/006; F02D 41/008; F02D 41/1475; F02D 41/0087; F02D 41/04; F02D 41/1498; F02D 41/0047; F02D 2200/101; F02M 26/01; F02M 26/04; F02M 26/43; F02M 2026/009; F02P 5/145
See application file for complete search history.

(56) References Cited

U.S. PATENT DOCUMENTS

| 9,534,567 | B2 | 1/2017 | Ulrey et al. |
| 9,631,582 | B2 | 4/2017 | Geckler et al. |
| 2003/0221667 | A1 | 12/2003 | Surnilla |

(Continued)

OTHER PUBLICATIONS

Search Report and Written Opinion, PCT Appln. No. PCT/US2017/067675, 13 pgs, dated Apr. 20, 2018.

*Primary Examiner* — George C Jin
(74) *Attorney, Agent, or Firm* — Taft Stettinius & Hollister LLP

(57) ABSTRACT

One embodiment is a system comprising an engine including a dedicated EGR cylinder configured to provide EGR to the engine via an EGR loop, a non-dedicated cylinder, a plurality of injectors structured to inject fuel into the dedicated EGR cylinder and the non-dedicated EGR cylinder, and an electronic control system operatively coupled with the fueling system and the ignition system. The electronic control system is configured to evaluate engine operating parameters including an engine load and an engine speed. The electronic control system is responsive to variation of the engine operating parameters to control operation of the fueling system to vary combustion in the at least one dedicated cylinder between rich of stoichiometric and stoichiometric.

13 Claims, 5 Drawing Sheets

(51) Int. Cl.
  *F02P 5/145* (2006.01)
  *F02M 26/00* (2016.01)
(52) U.S. Cl.
  CPC . *F02D 2200/101* (2013.01); *F02M 2026/009* (2016.02)

(56) References Cited

U.S. PATENT DOCUMENTS

| | | | |
|---|---|---|---|
| 2009/0308070 A1* | 12/2009 | Alger, II | F02D 13/0238 60/602 |
| 2014/0202433 A1* | 7/2014 | Dane | F02D 41/0065 123/568.11 |
| 2016/0017847 A1* | 1/2016 | Hilditch | F02D 41/0002 123/406.48 |
| 2016/0040589 A1* | 2/2016 | Glugla | F02M 26/43 60/278 |
| 2016/0363070 A1 | 12/2016 | Hotta | |
| 2017/0218863 A1 | 8/2017 | Geckler et al. | |
| 2019/0063349 A1* | 2/2019 | Perfetto | F02D 21/08 |
| 2019/0078522 A1* | 3/2019 | Tamaskar | F02D 41/107 |
| 2019/0293011 A1* | 9/2019 | Kang | F02D 41/0235 |
| 2020/0072142 A1* | 3/2020 | Kolhouse | F02D 41/1454 |

* cited by examiner

TECHNIQUES FOR IMPROVING FUEL ECONOMY IN DEDICATED EGR ENGINES

CROSS-REFERENCE TO RELATED APPLICATIONS

The present application is a continuation of International Patent Application No. PCT/US17/67675 filed on Dec. 20, 2017 which is incorporated herein by reference in its entirety for all purposes.

BACKGROUND

The present application relates to providing techniques to improving fuel efficiency in dedicated exhaust gas recirculation (EGR) engines, and more particularly, but not exclusively, to techniques for identifying engine speed and engine load conditions under which fueling of one or more dedicated cylinders can be varied to provide fuel economy benefits. Dedicated EGR engines typically include one or more cylinders which are dedicated to the provision of EGR via an EGR flow loop and one or more non-dedicated cylinders. Dedicated EGR engines offer the potential for increased EGR quality as the fueling of one or more dedicated EGR cylinders may be controlled to provide a rich combustion mixture resulting in increased combustible exhaust constituents such as $H_2$, CO and unburned hydrocarbon. However, operating dedicated EGRs with a rich of stoichiometric combustion mixture consumes additional fuel through combustion of a rich mixture and certain losses associated with EGR systems. Thus, there remains a significant unmet need for the unique apparatuses, methods, systems and techniques disclosed herein.

DISCLOSURE OF ILLUSTRATIVE EMBODIMENTS

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY OF THE DISCLOSURE

One embodiment is a system comprising an engine including a dedicated EGR cylinder configured to provide EGR to the engine via an EGR loop, a non-dedicated cylinder, a plurality of injectors structured to inject fuel into dedicated EGR cylinder and the non-dedicated EGR cylinder, and an electronic control system operatively coupled with the fueling system, the ignition system and the throttle. In certain forms, the electronic control system is configured to evaluate engine operating parameters including an engine load and an engine speed. In certain forms the electronic control system is responsive to variation of the engine operating parameters to control operation of the fueling system to vary combustion in the at least one dedicated cylinder between rich of stoichiometric and stoichiometric. Further embodiments, forms, objects, features, advantages, aspects, and benefits shall become apparent from the following description and drawings.

DESCRIPTION OF ILLUSTRATIVE EMBODIMENTS

Figure 1:
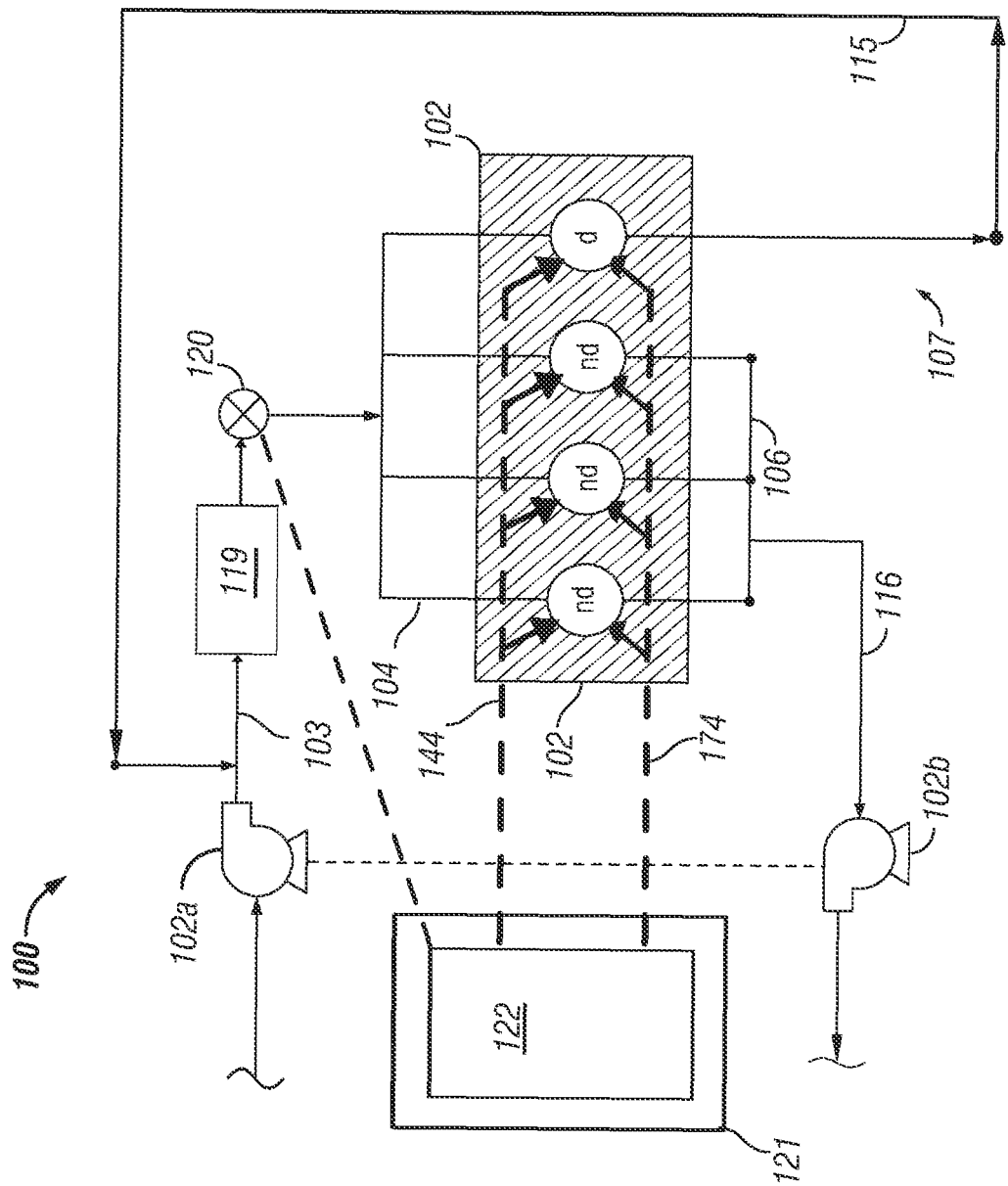
FIGS. 1 and 2 are schematic illustration of certain aspects of exemplary dedicated EGR engine systems.

With reference to FIG. 1, there is illustrated a system 100 including an exemplary dedicated EGR engine 102. Engine 102 includes a plurality of cylinders including a dedicated EGR cylinder (d) which is structured to provide EGR to EGR loop 107, and non-dedicated cylinders (nd) which are structured to provide exhaust to exhaust manifold 106. Engine 102 further includes a turbocharger including compressor 102a and turbine 102b. Turbine 102b receives exhaust from exhaust manifold 106 via exhaust conduit 116 effective to drive compressor which compresses intake air and discharges to intake conduit 103. Engine 102 is one example of a dedicated EGR engine in which the exhaust output of one or more dedicated EGR cylinders (d) is recirculated to the engine intake during at least certain operating conditions. Dedicated EGR cylinders (d) are generally structured to provide exhaust output which is separate from exhaust output provided by non-dedicated cylinders, during at least certain dedicated EGR operation modes.

During operation of system 100, EGR gas from the dedicated EGR cylinder (d) is recirculated through EGR loop 107 which includes EGR conduit 115. EGR is then combined with intake flow, for example, via a mixer. In the illustrated embodiment EGR is combined with the intake conduit 103 at a location downstream of and proximate the outlet of compressor 102a and upstream of intake manifold 104, intake throttle 120 and charge air cooler 119. It shall be appreciated that in other embodiments, EGR may be introduced in various other locations in the intake air system downstream of compressor 102a.

System 100 further includes an electronic control system 121 including an electronic control unit 122 which may include one or more microprocessors, microcontrollers, application specific integrated circuits (ASICs), non-transitory memory devices, and communication or networking interfaces. Electronic control system 121 is operatively coupled with ignition system 174 which includes a plurality of spark plugs (illustrated with arrows) structured to ignite a charge mixture in respective ones of the dedicated EGR cylinder and the non-dedicated cylinders. Electronic control system 121 is also operatively coupled with fueling system 144 which includes a plurality of injectors (illustrated with arrows) structured to inject fuel into respective ones of the dedicated EGR cylinder and the non-dedicated cylinders. In the illustrated embodiment, the injectors of fueling system are provided as direct injectors which inject fuel directly into the cylinder volume and are capable of delivering fuel into the cylinder volume when the intake valve(s) and exhaust valve(s) are closed. The direct injector may be structured to inject fuel at the top of the cylinder. In certain embodiments, one or more direct injectors may be structured to inject fuel into a corresponding one or more combustion pre-chambers or at other locations in the intake system. In certain embodiments pre-mixed or port injection systems may be provided and utilized for all cylinders and one or more direct injectors may be provided for providing additional fueling to one or more dedicated cylinders while the non-dedicated cylinders are fueled only via the pre-mixed or port injection. Additionally, in certain embodiments pre-mixed or port injection may be utilized for only the non-dedicated cylinders and one or more direct injectors may be utilized only for one or more dedicated cylinders.

In certain forms electronic control system 121 is structured to execute control operations effective to control fueling of the dedicated EGR cylinder and the non-dedicated cylinders independently from one another. Such independent control permits the non-dedicated cylinders to be controlled in a first combustion mode (e.g., to provide stoichiometric combustion during operation of engine 102) and the dedicated EGR cylinder to be controlled in a second combustion mode which may differ from the first combustion mode (e.g., to provide rich of stoichiometric combustion, stoichiometric combustion, or combustion in a fuel cut mode) as described in greater detail in below paragraphs.

In the illustrated embodiment, electronic control system 121 is structured to control the position of intake throttle 120. In further embodiments, electronic control system 121 is structured to control the position of an EGR valve, a wastegate or a variable geometry turbine. Electronic control system 121 is further structured to control the operation of other electronically controllable components associated with engine 102 or system 100. Electronic control system 121 is further structured to receive input from a number of sensors associated with system 100, for example, a first lambda or $O_2$ sensor may be structured to provide information indicative of the air-fuel ratio of the exhaust output by the non-dedicated cylinders and a second lambda or $O_2$ sensor may be structured to provide information indicative of the air-fuel ratio of the exhaust output by the dedicated EGR cylinder.

Electronic control system 121 is structured to implement the controls and perform the control operations described with reference to FIGS. 1-5. Such implementation and operation may include acts of determining certain values or parameters described herein. It shall be appreciated that determination of such values or parameters may comprise a number of operations, including calculation or computation, estimation, floating point operations, operating a look up table and a various other acts as would occur to one of skill in the art with the benefit of the present disclosure.

In the exemplary embodiment of FIG. 1, system 100 includes a dedicated EGR engine 102 which is provided as a turbocharged, four-cylinder, spark ignition (SI) engine with direct in-cylinder injection. It shall be appreciated that engine 102 may be provided in a variety of alternate forms varying from the illustrated embodiment in a number of respects. Engine 102 may be provided with additional or alternately-configured turbochargers or may be provided as a non-turbocharged or naturally aspirated engine. Engine 102 may be provided with a different numbers of cylinders and a different number of dedicated EGR cylinders (d), for example, as a six-cylinder engine with two dedicated EGR cylinders (d) or a different number of total cylinders and dedicated EGR cylinders (d). Regardless of the total number of cylinders, the number of dedicated EGR cylinders (d) may vary as a fixed design parameter, as a controllable system operating parameter by selecting which of a plurality of dedicated EGR cylinders (d) is flow coupled with the EGR loop, or both. Engine 102 may also be provided as a compression ignition engine such as a diesel engine or a dual fuel engine.

It shall be appreciated that system 100 and engine 102 may be provided in a variety of alternate forms varying from the illustrated embodiment in a number of respects. In certain forms the EGR loop may include an EGR valve structured to selectably vary the provision of exhaust to EGR loop 107 and to exhaust conduit 116 or a bypass valve capable of bypassing the EGR loop. In certain forms the EGR loop may include an EGR cooler and an EGR cooler bypass valve. In certain forms a dedicated throttle may be structured to selectably control the provision of charge air to the dedicated EGR cylinder (d) independently from the non-dedicated cylinders (nd). Further details of a number of examples of variation in the form and structure of system 100 and engine 102 may be found in commonly assigned U.S. Pat. No. 9,631,582 issued on Apr. 25, 2017 and entitled TECHNIQUES FOR CONTROLLING A DEDICATED EGR ENGINE the disclosure of which is hereby incorporated by reference. It shall be appreciated that in certain variations of the embodiments disclose herein, additional fuel may be introduced via an injector structured to inject fuel into the exhaust manifold of the dedicated cylinder and a water gas shift catalyst may be provided downstream of the direct cylinder exhaust manifold and utilized to convert the unburned fuel from both the cylinder and the additional injector to hydrogen. In further embodiments, a post-combustion injection to a dedicated cylinder by a direct injector may be utilized to add additional fuel to the cylinder which is then provided to a water gas shift catalyst downstream of the dedicated cylinder exhaust manifold to produce hydrogen.

The non-dedicated cylinders (nd) and dedicated EGR cylinder (d) of engine 102 receive their respective controllable combustion inputs, combust these inputs and output exhaust constituents via respective exhaust output flow paths. The exhaust constituents of the non-dedicated cylinders may be routed to an exhaust system including one or more aftertreatment components. The exhaust constituents of the dedicated EGR cylinder may be routed to the engine intake via an EGR loop, for example, EGR loop 107 illustrated and described in connection with FIG. 1. Exhaust constituents comprise exhaust constituents present at the exhaust manifold or outlet of the dedicated EGR cylinder. Exhaust constituents comprise inert exhaust constituents such as $CO_2$, H2O unburned air constitutes such as $O_2$ and $N_2$, and unburnt fuel constituents, e.g., $H_2$, CO and hydrocarbons.

When the dedicated EGR cylinder(s) (d) is "run rich" (i.e., in a rich of stoichiometric combustion mode), the EGR contains inert and unburnt fuel constituents. When the dedicated EGR cylinder(s) (d) is "run stoichiometric" (i.e., in a stoichiometric combustion mode where steady state combustion occurs in all cylinders of engine 102), the EGR contains only inert components. Further, when the dedicated EGR cylinder(s) (d) is "run lean" or in a "fuel cut mode" (such as during a fuel reduction, engine cranking, or cut off mode), the EGR contains unburnt air and inert gasses. It shall be further appreciated that, in instances where the fuel is cut, the EGR path may contain only air. Additionally, during a fuel cut event a combination of air and residual exhaust constituents may be present in the EGR path for a period of time and thereafter the path may contain only air. Another case is misfire of the dedicated cylinder (d) when no combustion happens or incomplete combustion occurs and the unburned fuel vapor and air are released into the exhaust.

Figure 2:
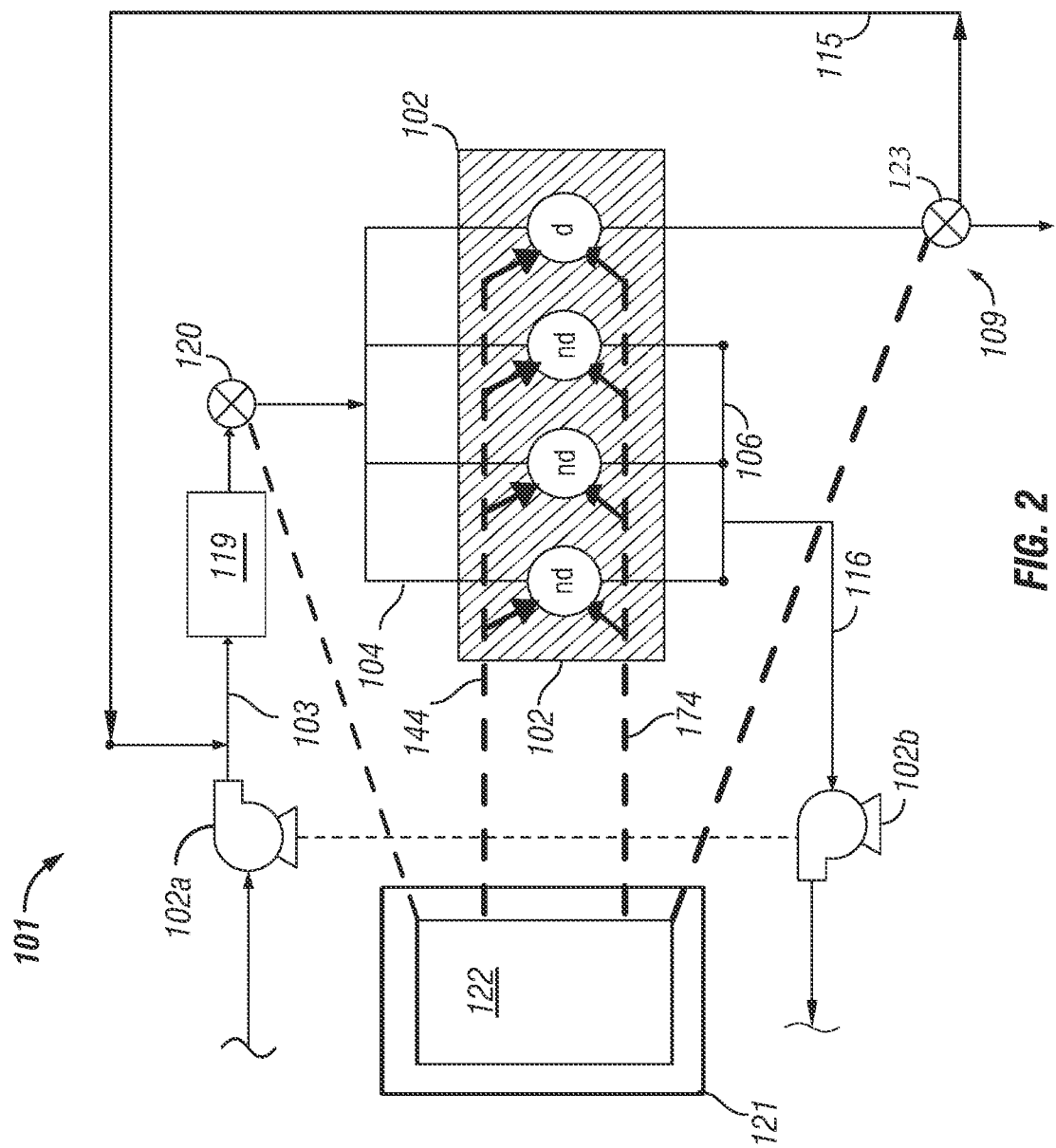

With reference to FIG. 2, there is illustrated a system 101 including a number of substantially similar features as those illustrated and described in connection with FIG. 1 which are labeled with like reference numerals as those of FIG. 1. System 101 further includes an EGR valve 123. In the illustrated embodiment EGR valve 123 is provided as a proportional three-way valve which is controllable by an electronic control system to selectably route exhaust through EGR loop 109 to the intake of dedicated EGR engine 102 or to an exhaust system such as an aftertreatment system and tailpipe in variable proportion. In certain embodiments, the exhaust flow from EGR valve 123 may be routed to a location upstream of the turbine of the turbocharger to contribute to turbocharging. In further embodiments, the EGR valve may be provided as a proportional flow valve configured to vary the flow or fraction of EGR to the dedicated EGR engine but without providing any direct flow path to an exhaust system.

Figure 3:
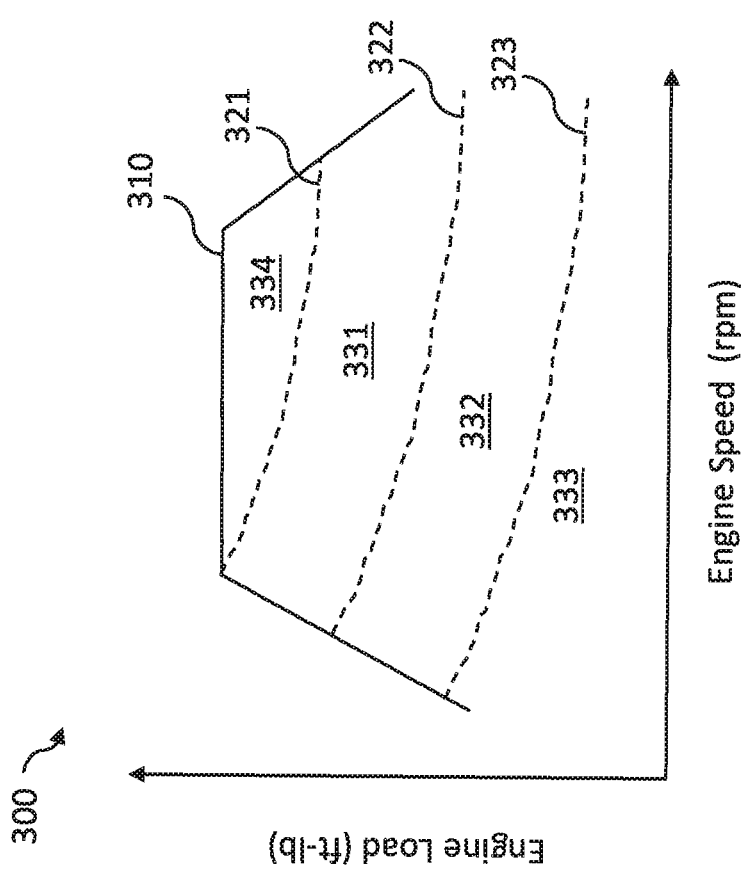
FIG. 3 is a graphical representation of an exemplary engine operating map for dedicated EGR engine systems.

With reference to FIG. 3 there is illustrated an exemplary engine operating map 300 for a dedicated EGR engine such as engine 102. Engine operating map 300 depicts engine load in units of (ft-lb) on its vertical axis and depicts engine speed in units of (rpm) on its horizontal axis. It shall be appreciated that in other embodiments engine load may be specified in terms of various other units such as brake horsepower or Newton-Meters (N-M), among others. Engine speed may also be specified in terms of various other units such as angular frequency, among others. Engine operating map 300 depicts a torque curve 310 which defines an engine operating boundary indicating a maximum engine load over a range of engine speeds.

Engine operating map 300 further depicts boundary curves 321, 322 and 323. In describing boundary curves 321, 322 and 323, reference is made to the terms full EGR percentage, EGR quality index (EQI), maximum brake torque (MBT) ignition timing, and engine knock limits. Full EGR percentage is a function of the design of a given dedicated EGR engine and may be defined as the ratio of the number of dedicated cylinders to the total number of cylinders. Thus, in a four-cylinder dedicated EGR engine with one dedicated cylinder and three non-dedicated cylinders, the full EGR percentage is 25%. In a six-cylinder dedicated EGR engine with two dedicated cylinder and four non-dedicated cylinders, the full EGR percentage is approximately 33%. It shall be appreciated that EGR percentages less than a full EGR percentage may be provided by fueling of dedicated EGR cylinder(s) that is lean of stoichiometric and that a zero EGR percentage may be provided by zero fueling or fuel cut operation to the dedicated EGR cylinder(s).

EQI is an index value describing the quality of EGR produced by the dedicated cylinder under different combustion mixture conditions and relates to the quantity of H and CO in the EGR gas. EQI ranges from 0 for stoichiometric combustion in the dedicated cylinder to 1 for combustion at the rich misfire limit in the dedicated cylinder. Higher EQI values typically provide combustion less susceptible to engine knock.

MBT ignition timing is defined as the ignition timing (also referred to as spark timing or spark plug firing timing) that provides the maximum brake torque relative to other ignition timings for given combustion conditions. Delaying or retarding ignition timing relative to MBT ignition timing typically produces less torque while avoiding engine knock. It shall be appreciated that delaying or retarding ignition timing relative to MBT ignition timing may be applied to all cylinders of an engine including dedicated EGR cylinders and EGR non-dedicated cylinders.

Knock limits refer to one or more thresholds or limits defined relative to the occurrence of engine knock. In one example, knock limits may be defined as engine operation in which no engine knock occurs. Knock limits can also be defined in other ways, for example, as a non-zero limit on the number of knock occurrences or a frequency of knock occurrences, or as a threshold providing a safety margin relative to operating conditions under which knock occurs.

Boundary curve 321 defines a boundary on the engine operating map 300 below which the dedicated EGR engine can operate with a full EGR percentage, EQI equal to 1 and at MBT ignition timing. At operating points below boundary curve 321, the dedicated cylinder(s) can be run at its rich misfire limit and the non-dedicated cylinders can be operated at stoichiometric without exceeding knock limits. At operating points above boundary curve 321, ignition timing must be delayed relative to MBT ignition timing to avoid exceeding knock limits.

Boundary curve 322 defines the boundary below which the dedicated EGR engine can operate with a full EGR percentage, at an EQI equal to 0 and at MBT ignition timing without exceeding knock limits. At operating points below boundary curve 322, the dedicated cylinder(s) and the non-dedicated cylinders can be operated at stoichiometric without exceeding knock limits. At operating points above boundary curve 321, EQI must be greater than zero to avoid exceeding knock limits.

Boundary curve 323, defines a boundary on engine operating map 300 below which the engine can operate with zero EGR and at MBT ignition timing without exceeding knock limits. Boundary curve 323 may also be referred to as a zero EGR curve or a fuel cut curve. At engine operating points below boundary curve 323 engine operation can be controlled such that zero fuel is provided to the dedicated cylinder and still run the other cylinders without exceeding knock limits.

Boundary curves 321, 322 and 323 may be empirically determined for a given dedicated EGR engine design by varying fueling to the dedicated EGR cylinders for a plurality of engine speeds and engine loads and observing under what conditions engine knock occurs. Boundary curves 321, 322 and 323, can also be utilized to define operating zones 331, 332, 333 and 334 on engine operating map 300 for which different engine control parameters may be specified. The specified engine control parameters may include, dedicated cylinder fueling parameters and dedicated cylinder ignition timing values as well as other air handling, fueling, and ignition timing values including non-dedicated cylinder fueling, non-dedicated cylinder ignition timing, EGR valve position, intake throttle position, and turbocharger actuator position (e.g., wastegate actuator position or variable geometry turbine (VGT) actuator position), among others. The engine control parameters selected for operating zones 331, 332, 333 and 334 and sub-regions or areas thereof on engine operating map 300 may be implemented in control processes and controls logic such as the processes and logic described below in connection with FIGS. 4 and 5.

Below the upper boundary 321 of operating zone 331, engine control parameters may be selected to provide dedicated EGR engine operation at a full EGR percentage, rich fueling of the dedicated cylinder(s) to provide an EQI equal to 1 and at MBT ignition timing. In some embodiments engine control parameters may be selected to vary the richness of fueling of the dedicated cylinder(s) and resulting EQI in different regions of operating zone 331. For example, different regions of operating zone 331 may vary fueling of the dedicated EGR cylinder(s) among a plurality of rich fueling values providing EQI values ranging from 1 to values less than 1 and greater than zero. For example, in certain embodiments, operating zone 331 may be subdivided into multiple regions with rich fueling values providing different EQI values ranging from 1 at a maximum region (e.g. a region closest to boundary 321) downward toward zero at a minimum region (e.g. a region closest to boundary 322). Furthermore, in certain embodiments a scaling factor or gradient function may be defined for rich fueling values or EQI within operating zone 331.

Below the upper boundary 322 of operating zone 332, engine control parameters may be selected to provide dedicated EGR engine operation at a full EGR percentage, stoichiometric fueling of the dedicated cylinder(s) to provide an EQI equal to 0, and at MBT ignition timing. In some embodiments engine control parameters may be selected to vary the fueling of the dedicated cylinder(s) and resulting EGR percentages in different regions of operating zone 332. For example, in certain embodiments, different regions of operating zone 332 may vary fueling of the dedicated EGR cylinder(s) among a plurality of values ranging from stoichiometric fueling of the dedicated cylinder(s) providing a full EGR percentage and an EQI equal to 0 at a maximum region (e.g. a region closest to boundary 322), over a range of lean fueling values of the dedicated cylinder(s) providing operation at EGR percentages less than a full EGR percentage, and down to a lean fueling value of the dedicated cylinder(s) providing operation at EGR percentages greater than but approaching a zero EGR percentage at a minimum region (e.g. a region closest to boundary 323). Furthermore, in certain embodiments a scaling factor or gradient function may be defined for fueling values at or less than stoichiometric within operating zone 331.

Below the upper boundary 323 of operating zone 333, engine control parameters may be selected to provide engine control parameters may be selected to provide zero percent EGR and no fueling of the dedicated cylinder(s). Above the upper boundary 321 of operating zone 334, engine control parameters may be selected to provide dedicated EGR engine operation at a full EGR percentage, rich fueling of the dedicated cylinder(s) to provide an EQI equal to 1 and at ignition timing that is delayed or retarded relative to MBT ignition timing.

Figure 4:
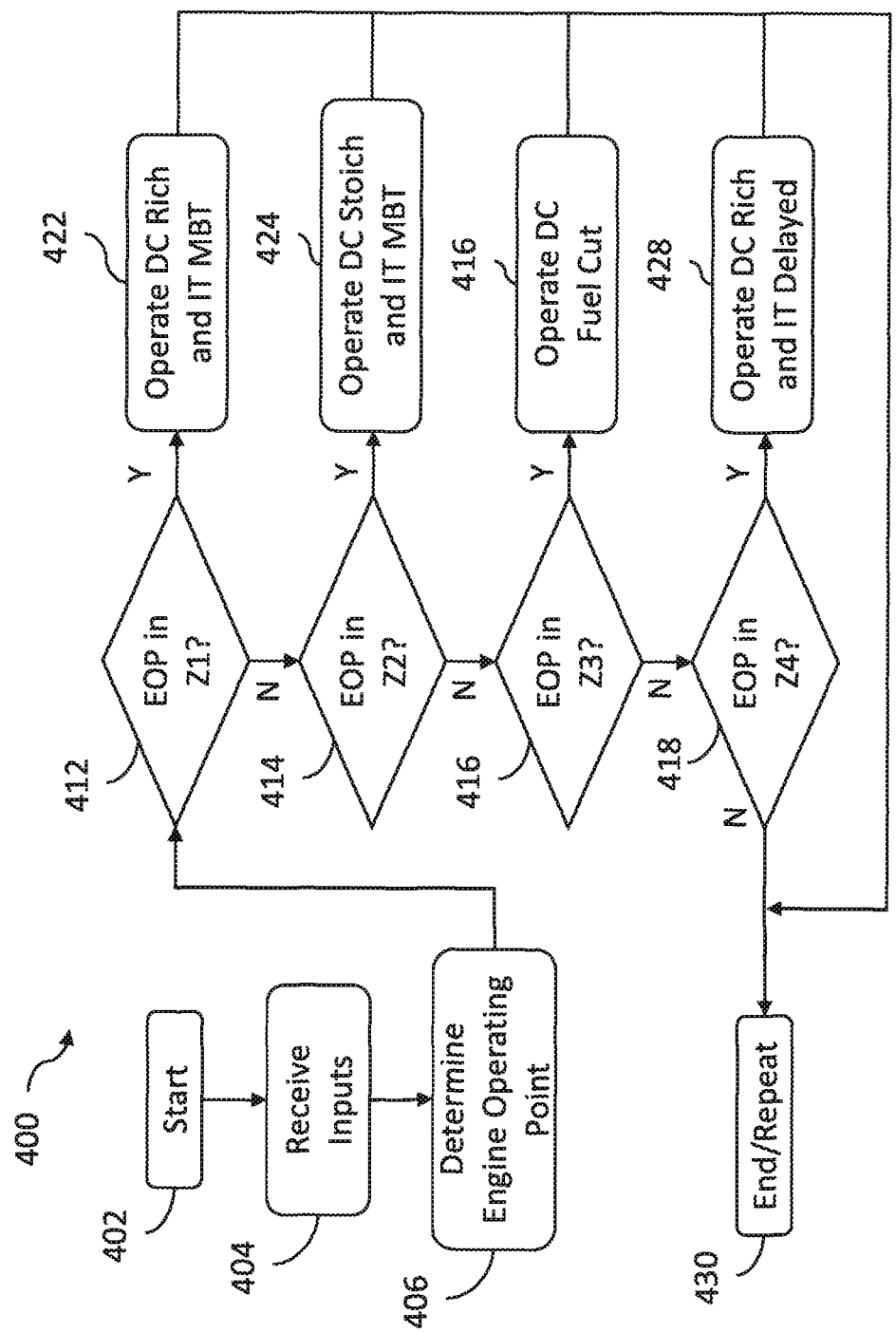
FIG. 4 is a flow diagram illustrating certain aspects of an exemplary control process used in connection with dedicated EGR systems.

With reference to FIG. 4 there is illustrated a flow diagram illustrating certain aspects of an exemplary control process 400 which may be implemented in an electronic control system associated with a dedicated EGR engine, for example, ECS 121 and engine 102. Control process 400 begins at start operation 402 and proceeds to operation 402 at which engine operating parameters including engine speed and engine load and possibly other engine operating parameters are received as inputs to control process 400. From operation 404, control process 400 proceeds to operation 406 which determines an engine operating point including an engine speed and an engine load and possibly other engine operating point values based upon the received inputs. From operation 406 control process proceeds to conditional 412.

Conditional 412 evaluates whether the engine operating point is in in a first zone on an engine operating map, for example, zone 331 described above in connection with FIG. 3. If conditional 412 determines that the engine operating point is in in the first zone, control process 400 proceeds to operation 422 which operates the dedicated EGR engine such that the dedicated EGR cylinders operate with rich combustion and at MBT ignition timing. In certain forms, operation 422 provides engine operating in accordance with that described for zone 331 described above in connection with FIG. 3. From operation 422, control process 400 proceeds to operation 430 which ends or repeats control process 430. If conditional 412 determines that the engine operating point is not in in the first zone, control process 400 proceeds to conditional 414.

Conditional 414 evaluates whether the engine operating point is in in a second zone on an engine operating map, for example, zone 332 described above in connection with FIG. 3. If conditional 414 determines that the engine operating point is in in the second zone, control process 400 proceeds to operation 424 which operates the dedicated EGR engine such that the dedicated EGR cylinders operate with stoichiometric combustion and at MBT ignition timing. In certain forms, operation 422 provides engine operating in accordance with that described for zone 332 described above in connection with FIG. 3. From operation 424, control process 400 proceeds to operation 430 which ends or repeats control process 430. If conditional 414 determines that the engine operating point is not in in the second zone, control process 400 proceeds to conditional 416.

Conditional 416 evaluates whether the engine operating point is in in a third zone on an engine operating map, for example, zone 333 described above in connection with FIG. 3. If conditional 416 determines that the engine operating point is in in the third zone, control process 400 proceeds to operation 426 which operates the dedicated EGR engine such that fuel is cut to the dedicated EGR cylinders. In certain forms, operation 422 provides engine operating in accordance with that described for zone 333 described above in connection with FIG. 3. From operation 426, control process 400 proceeds to operation 430 which ends or repeats control process 430. If conditional 416 determines that the engine operating point is not in the third zone, control process 400 proceeds to conditional 418.

Conditional 418 evaluates whether the engine operating point is in in a fourth zone on an engine operating map, for example, zone 334 described above in connection with FIG. 3. If conditional 418 determines that the engine operating point is in in the fourth zone, control process 400 proceeds to operation 428 which operates the dedicated EGR engine such that the dedicated EGR cylinders operate with rich combustion and at ignition timing delayed relative to MBT ignition timing. In certain forms, operation 428 provides engine operating in accordance with that described for zone 334 described above in connection with FIG. 3. From operation 428, control process 400 proceeds to operation 430 which ends or repeats control process 430. If conditional 418 determines that the engine operating point is not in in the fourth zone, control process 400 also proceeds to operation 430.

While conditionals 412, 414, 416 and 418 are illustrated as a series of operations, it shall be appreciated that the operations of process 400 may also be structured in a number of different manners. For example, the operations of process 400 may be structured such that their respective operations are performed in parallel or by a combined conditional operator which tests for engine operating point in multiple locations. Furthermore, the evaluations and resulting commands of conditionals 412, 414, 416 and 418 may be implemented using control logic such as that described in connection with FIG. 5.

Figure 5:
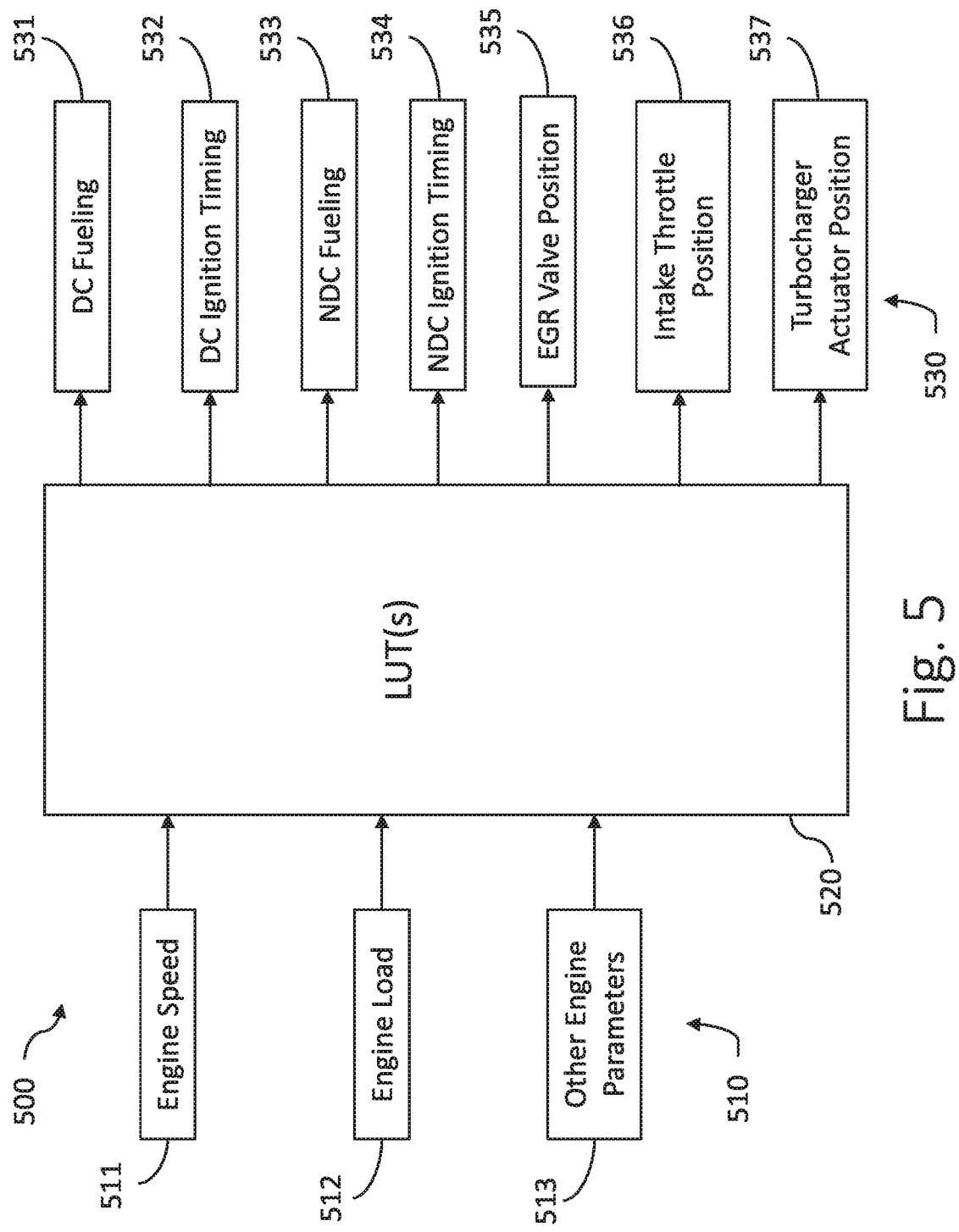
FIG. 5 is a schematic illustration of certain aspects of exemplary controls for dedicated EGR engines.

With reference to FIG. 5 there is illustrated a schematic diagram of exemplary control logic 500 which may be implemented in one or more electronic control units of an electronic control system such electronic control unit 122 of electronic control system 121. Control logic 500 utilize control inputs 510 including engine speed 511 and engine load 512. In certain forms, control inputs 510 may also include other engine operating parameters 513.

Control inputs 510 are provided to lookup table block 520 which includes one or more lookup tables, matrices or maps structured to provide outputs associated with different values or value ranges of the inputs provided to lookup table block. In the illustrated embodiment, lookup table block 520 is configured to provide control outputs 530 which include dedicated cylinder fueling 531, dedicated cylinder ignition timing 532, non-dedicated cylinder fueling 533, non-dedicated cylinder ignition timing 534, EGR valve position 535, intake throttle position 536, and turbocharger actuator position 537 which may be, for example, a wastegate actuator position or a variable geometry turbine actuator position.

Lookup table block 520 is configured to provide values for outputs 530 in response to inputs in accordance with an engine operating map which may be at least in part empirically determined, such as engine operating map 300 described above in connection with FIG. 3. It shall be further appreciated that in certain embodiments, explicit calculations, formulae, or other techniques as would occur to one of skill in the art with the benefit of the present disclosure may be utilized in lieu of or in combination with lookup table block 520. In response to the received inputs, lookup table block 520 provides control outputs 530 which are utilized to control operation of a dedicated EGR engine such as engine 102.

In certain forms, lookup table block 520 may be structured to include a first lookup table, matrix, map or other control logic dedicated to determining fueling and ignition timing commands for dedicated EGR cylinder(s) (e.g., dedicated cylinder fueling 531 and dedicated cylinder ignition timing 532) in response to engine speed 511 and engine load 512. In such forms one or more additional lookup tables, matrices, maps or other control logic may be utilized to determine additional control commands such as non-dedicated cylinder fueling 533, non-dedicated cylinder ignition timing 534, EGR valve position 535, intake throttle position 536, and turbocharger actuator position 537. In other forms, lookup table block 520 may be structured to provide lookup table that combines the determination of fueling and ignition timing commands for dedicated EGR cylinder(s) (e.g., dedicated cylinder fueling 531 and dedicated cylinder ignition timing 532) with the determination of one or more additional control commands such as non-dedicated cylinder fueling 533, non-dedicated cylinder ignition timing 534, EGR valve position 535, intake throttle position 536, and turbocharger actuator position 537.

A number of exemplary embodiments shall now be further described.

A first exemplary embodiment is a system comprising: an internal combustion engine including a plurality of cylinders, the plurality of cylinders including at least one dedicated exhaust gas recirculation (EGR) cylinder configured to provide EGR to the engine via an EGR loop and at least one non-dedicated cylinder; a fueling system including a plurality of injectors structured to inject fuel into respective ones of the plurality of cylinders; an ignition system including a plurality of spark plugs structured to ignite charge mixture in respective ones of the plurality of cylinders; and an electronic control system operatively coupled with the fueling system, and the ignition system, and the electronic control system being configured to: evaluate engine operating parameters including an engine load and an engine speed, and in response to variation in the engine operating parameters, control operation of the fueling system to vary combustion in the at least one dedicated cylinder among a plurality of fueling values ranging from rich of stoichiometric to zero fueling.

In certain forms of the first exemplary embodiment the plurality of fueling values include a first set of the plurality of fueling values ranging from rich of stoichiometric to stoichiometric and a second set of the plurality of fueling values ranging from stoichiometric to zero fueling. In certain forms the electronic control system is configured to: evaluate an operating point of the engine on an engine operating map having an engine load axis and an engine speed axis; in response to an evaluation that the operating point is in a first region of the engine operating map, control the fueling system to provide combustion in the at least one dedicated EGR cylinder which is rich of stoichiometric; in response to an evaluation that the operating point is in a second region of the engine operating map, control the fueling system to provide combustion in the at least one dedicated EGR cylinder which is stoichiometric; in response to an evaluation that the operating point is in a third region of the engine operating map, control the fueling system to provide combustion in the at least one dedicated EGR cylinder which is lean of stoichiometric; and in response to an evaluation that the operating point is in a fourth region of the engine operating map, control the fueling system to provide zero fueling to the at least one dedicated EGR cylinder. In certain forms the first region is bounded by a first empirically determined boundary below which the engine operates with a maximum brake torque (MBT) ignition timing and an EGR exhaust quality index (EQI) equal to 1 without exceeding a knock limit and a second empirically determined boundary below which the engine operates with the MBT ignition timing and the EGR EQI equal to 0 without exceeding the knock limit. In certain forms the second region is bounded at an upper end by the second empirically determined boundary. In certain forms the third region is bounded at a lower end by a third empirically determined boundary below which the engine operates with the MBT ignition timing and no EGR without exceeding the knock limit. In certain forms the electronic control system is configured to, in response to an evaluation that the operating point is in a fifth region of the engine operating map, control the fueling system to provide combustion in the at least one dedicated EGR cylinder which is rich of stoichiometric and control the ignition system to provide ignition timing which is delayed relative to the MBT ignition timing. In certain forms the fifth region is bounded by the first empirically determined boundary and a torque limit curve. In certain forms the electronic control system operatively is operatively coupled with a throttle structured to control gas flow to the plurality of cylinders. In certain forms, the engine is a four-cylinder engine with a single dedicated EGR cylinder. In certain forms the engine is a six-cylinder engine with two dedicated EGR cylinders.

A second exemplary embodiment is a method comprising operating a system according to the first exemplary embodiment or any of its forms to perform the operations which the electronic control system is configured to perform.

A third exemplary embodiment is a method comprising: operating an internal combustion engine including: a plurality of cylinders, the plurality of cylinders including at least one dedicated EGR cylinder configured to provide EGR to the engine via an EGR loop and at least one non-dedicated cylinder, a fueling system including a plurality of injectors structured to inject fuel into respective ones of the plurality of cylinders, an ignition system including a plurality of spark plugs structured to ignite charge mixture in respective ones of the plurality of cylinders, and an electronic control system operatively coupled with the fueling system and the ignition system; evaluating with the electronic control system an engine load and an engine speed; and in response to variation in at least one of the engine load and the engine speed, operating the electronic control system to control operation of the fueling system to vary combustion in the at least one dedicated cylinder among a plurality of fueling values ranging from stoichiometric fueling to zero fueling.

Certain forms of the third exemplary embodiment comprise, in response to second variation in the engine operating parameters, operating the electronic control system to control operation of the fueling system to vary combustion in the at least one dedicated cylinder among a second plurality of fueling values ranging from rich of stoichiometric to stoichiometric. Certain forms comprise operating the electronic control system to: evaluate an operating point of the engine on an engine operating map having an engine load axis and an engine speed axis; in response to an evaluation that the operating point is in a first region of the engine operating map, control the fueling system to provide combustion in the at least one dedicated EGR cylinder which is rich of stoichiometric; in response to an evaluation that the operating point is in a second region of the engine operating map, control the fueling system to provide combustion in the at least one dedicated EGR cylinder which is stoichiometric; in response to an evaluation that the operating point is in a third region of the engine operating map, control the fueling system provide combustion in the at least one dedicated EGR cylinder which is lean of stoichiometric; and in response to an evaluation that the operating point is in a fourth region of the engine operating map, control the fueling system to provide zero fueling to the at least one dedicated EGR cylinder. In certain forms the first region is bounded by a first empirically determined boundary below which the engine operates with the maximum brake torque (MBT) ignition timing and an EGR exhaust quality index (EQI) equal to 1 without exceeding a knock limit and a second empirically determined boundary below which the engine operates with the MBT ignition timing and the EGR EQI equal to 0 without exceeding the knock limit. In certain forms the second region is bounded at an upper end by the second empirically determined boundary. In certain forms the third region is bounded at a lower end by a third empirically determined boundary below which the engine operates with the MBT ignition timing and no EGR without exceeding the knock limit. Certain forms comprise, in response to an evaluation that the operating point is in a fifth region of the engine operating map, operating the electronic control system to control the fueling system to provide combustion in the at least one dedicated EGR cylinder which is rich of stoichiometric and control the ignition system to provide ignition timing which is delayed relative to the MBT ignition timing. In certain forms the fifth region is bounded by the first empirically determined boundary and a torque limit curve.

A fourth exemplary embodiment is a system comprising an electronic control system configured to perform the operations of the third exemplary embodiment or any of its forms.

A fifth exemplary embodiment is a method of operating an electronic control system to improve fuel economy of a dedicated EGR internal combustion engine, the method comprising: evaluating an operating point including an engine speed and an engine load of the dedicated EGR engine relative to an engine operating map including an engine speed axis and an engine load axis, the engine operation map including a first zone corresponding to rich fueling of the one or more dedicated cylinders of the dedicated EGR engine, a second zone corresponding to stoichiometric fueling or lean fueling of the one or more dedicated cylinders, and a third zone corresponding to zero fueling of the one or more dedicated cylinders; if the operating point is in the first zone, operating the electronic control system to provide rich fueling of the one or more dedicated EGR cylinders; if the operating point is in the second zone, operating the electronic control system to provide fueling of the one or more dedicated EGR cylinders ranging from stoichiometric fueling to lean fueling; if the operating point is in the third zone, operating the electronic control system to provide no fueling of the one or more dedicated EGR cylinders.

In certain forms of the fifth exemplary embodiment the first operating zone is empirically determined to require EGR with rich fueling of the one or more dedicated EGR cylinders in order to satisfy one or more engine knock criteria, the second operating zone is empirically determined to require EGR with fueling of the one or more dedicated EGR cylinders ranging from stoichiometric to lean in order to satisfy the one or more engine knock criteria, and the third zone is empirically determined not to require EGR to satisfy the one or more engine knock criteria. Certain forms comprise, if the operating point is in a fourth zone, operating the electronic control system to provide rich fueling of the one or more dedicated EGR cylinders and delayed ignition timing relative to an ignition timing of the first zone.

A sixth exemplary embodiment is an electronic control system configured to perform the operations of the fifth exemplary embodiment or any of its forms.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
    an internal combustion engine including a plurality of cylinders, the plurality of cylinders including at least one dedicated exhaust gas recirculation (EGR) cylinder configured to provide EGR to the engine via an EGR loop and at least one non-dedicated cylinder;
    a fueling system including a plurality of injectors structured to inject fuel into respective ones of the plurality of cylinders;
    an ignition system including a plurality of spark plugs structured to ignite charge mixture in respective ones of the plurality of cylinders; and an electronic control system operatively coupled with the fueling system and the ignition system, the electronic control system being configured to:
- evaluate engine operating parameters including an engine load and an engine speed;
- in response to variation in the engine operating parameters, control operation of the fueling system to vary combustion in the at least one dedicated cylinder among a plurality of fueling values ranging from rich of stoichiometric to zero fueling;
- evaluate an operating point of the engine on an engine operating map having an engine load axis and an engine speed axis;
- in response to an evaluation that the operating point is in a first region of the engine operating map, control the fueling system to provide combustion in the at least one dedicated EGR cylinder which is rich of stoichiometric;
- in response to an evaluation that the operating point is in a second region of the engine operating map, control the fueling system to provide combustion in the at least one dedicated EGR cylinder which is stoichiometric;
- in response to an evaluation that the operating point is in a third region of the engine operating map, control the fueling system to provide to provide combustion in the at least one dedicated EGR cylinder which is lean of stoichiometric; and
- in response to an evaluation that the operating point is in a fourth region of the engine operating map, control the fueling system to provide zero fueling to the at least one dedicated EGR cylinder.

2. The system of claim 1 wherein the first region is bounded by a first empirically determined boundary below which the engine operates with a maximum brake torque (MBT) ignition timing and an EGR exhaust quality index (EQI) equal to 1 without exceeding a knock limit and a second empirically determined boundary below which the engine operates with the MBT ignition timing and the EGR EQI equal to 0 without exceeding the knock limit.

3. The system of claim 2 wherein the second region is bounded at an upper end by the second empirically determined boundary.

4. The system of claim 3 wherein the third region is bounded at a lower end by a third empirically determined boundary below which the engine operates with the MBT ignition timing and no EGR without exceeding the knock limit.

5. The system of claim 1 wherein the electronic control system is configured to, in response to an evaluation that the operating point is in a fifth region of the engine operating map, control the fueling system to provide combustion in the at least one dedicated EGR cylinder which is rich of stoichiometric and control the ignition system to provide ignition timing which is delayed relative to the MBT ignition timing.

6. The system of claim 5 wherein the fifth region is bounded by the first empirically determined boundary and a torque limit curve.

7. The system of claim 1, wherein at least one of (a) the electronic control system is operatively coupled with a throttle structured to control gas flow to the plurality of cylinders, and (b) the engine is one of a four-cylinder engine with a single dedicated EGR cylinder and a six-cylinder engine with two dedicated EGR cylinders.

8. A method comprising:
operating an internal combustion engine including a plurality of cylinders, the plurality of cylinders including at least one dedicated EGR cylinder configured to provide EGR to the engine via an EGR loop and at least one non-dedicated cylinder, a fueling system including a plurality of injectors structured to inject fuel into respective ones of the plurality of cylinders, an ignition system including a plurality of spark plugs structured to ignite charge mixture in respective ones of the plurality of cylinders, and an electronic control system operatively coupled with the fueling system and the ignition system;
evaluating, with the electronic control system, an engine load and an engine speed;
in response to variation in at least one of the engine load and the engine speed, operating the electronic control system to control operation of the fueling system to vary combustion in the at least one dedicated cylinder among a plurality of fueling values ranging from stoichiometric fueling to zero fueling, and further comprising operating the control system to:
- evaluate an operating point of the engine on an engine operating map having an engine load axis and an engine speed axis;
- in response to an evaluation that the operating point is in a first region of the engine operating map, control the fueling system to provide combustion in the at least one dedicated EGR cylinder which is rich of stoichiometric;
- in response to an evaluation that the operating point is in a second region of the engine operating map, control the fueling system to provide combustion in the at least one dedicated EGR cylinder which is stoichiometric;
- in response to an evaluation that the operating point is in a third region of the engine operating map, control the fueling system provide combustion in the at least one dedicated EGR cylinder which is lean of stoichiometric; and
- in response to an evaluation that the operating point is in a fourth region of the engine operating map, control the fueling system to provide zero fueling to the at least one dedicated EGR cylinder.

9. The method of claim 8 wherein the first region is bounded by a first empirically determined boundary below which the engine operates with the maximum brake torque (MBT) ignition timing and an EGR exhaust quality index (EQI) equal to 1 without exceeding a knock limit and a second empirically determined boundary below which the engine operates with the MBT ignition timing and the EGR EQI equal to 0 without exceeding the knock limit.

10. The method of claim 9 wherein the second region is bounded at an upper end by the second empirically determined boundary.

11. The method of claim 10 wherein the third region is bounded at a lower end by a third empirically determined boundary below which the engine operates with the MBT ignition timing and no EGR without exceeding the knock limit.

12. The method of claim 8 comprising, in response to an evaluation that the operating point is in a fifth region of the engine operating map, operating the electronic control system to control the fueling system to provide combustion in the at least one dedicated EGR cylinder which is rich of stoichiometric and control the ignition system to provide ignition timing which is delayed relative to the MBT ignition timing.

13. The method of claim 12 wherein the fifth region is bounded by the first empirically determined boundary and a torque limit curve.

\* \* \* \* \*